(12) United States Patent
Melchiors et al.

(10) Patent No.: US 7,232,860 B2
(45) Date of Patent: Jun. 19, 2007

(54) AQUEOUS BINDER DISPERSIONS AS COATING COMPOSITIONS

(75) Inventors: Martin Melchiors, Leichlingen (DE); Ulrich Freudenberg, Pulheim (DE); Robert Reyer, Tönisvorst (DE); Raul Pires, Köln (DE); Sandra Grosskopf, Bedburg (DE)

(73) Assignee: Bayer MaterialScience AG, Leverkusen (DE)

( * ) Notice: Subject to any disclaimer, the term of this patent is extended or adjusted under 35 U.S.C. 154(b) by 323 days.

(21) Appl. No.: 10/640,546

(22) Filed: Aug. 13, 2003

(65) Prior Publication Data

US 2004/0034164 A1 Feb. 19, 2004

(30) Foreign Application Priority Data

Aug. 16, 2002 (DE) ................. 102 37 576

(51) Int. Cl.
*C08F 6/02* (2006.01)
*C08F 220/18* (2006.01)
*C08L 35/02* (2006.01)
*B05D 3/02* (2006.01)

(52) U.S. Cl. ............. 524/823; 524/824; 524/832; 524/833; 528/492; 427/385.5

(58) Field of Classification Search ........... 524/823, 524/824, 832, 833; 525/440; 528/492
See application file for complete search history.

(56) References Cited

U.S. PATENT DOCUMENTS

| | | | |
|---|---|---|---|
| 5,075,370 A | 12/1991 | Kubitza et al. | 524/591 |
| 5,252,696 A | 10/1993 | Laas et al. | 528/49 |
| 5,317,063 A | 5/1994 | Komatsu et al. | 525/330.2 |
| 5,336,711 A | 8/1994 | Schneider et al. | 524/507 |
| 5,539,022 A * | 7/1996 | Schmidt et al. | 523/402 |
| 5,612,434 A | 3/1997 | Epple et al. | 526/282 |
| 5,648,410 A | 7/1997 | Hille et al. | 523/501 |
| 5,759,631 A | 6/1998 | Rink et al. | 427/407.1 |
| 5,876,802 A | 3/1999 | Brunnemann et al. | 427/409 |
| 6,376,602 B1 | 4/2002 | Probst et al. | 524/591 |
| 6,399,691 B1 | 6/2002 | Melchiors et al. | 524/457 |
| 6,426,414 B1 | 7/2002 | Laas et al. | 544/222 |
| 6,429,256 B1 | 8/2002 | Vandevoorde et al. | 524/591 |
| 6,586,521 B2 | 7/2003 | Blum et al. | 524/522 |
| 2001/0056154 A1 | 12/2001 | Blum et al. | 524/522 |
| 2002/0052451 A1 | 5/2002 | Vandevoorde et al. | 525/533 |

FOREIGN PATENT DOCUMENTS

| | | |
|---|---|---|
| DE | 42 26 270 | 2/1994 |
| DE | 100 07 821 | 8/2001 |
| DE | 100 24 624 | 11/2001 |
| FR | 2 276 340 | 1/1976 |
| GB | 1023281 | 3/1966 |

* cited by examiner

*Primary Examiner*—Tae H. Yoon
(74) *Attorney, Agent, or Firm*—Joseph C. Gil

(57) ABSTRACT

An aqueous binder dispersion that includes at least one copolymer (P) containing carboxylic acid and/or carboxylate groups. The copolymer (P) includes structural units of carboxyl-free (meth)acrylic esters with a cycloaliphatic structure, and at least 25 mol % of the carboxylic acid groups of the copolymer (P) in the dispersion being present in triethanolamine-neutralized form. The aqueous binder can be used in aqueous coating materials, which can be used to coat a substrate.

12 Claims, No Drawings

AQUEOUS BINDER DISPERSIONS AS COATING COMPOSITIONS

CROSS REFERENCE TO RELATED PATENT APPLICATION

The present patent application claims the right of priority under 35 U.S.C. §119 (a)–(d) of German Patent Application No. 102 37 576.3, filed Aug. 16, 2002.

FIELD OF THE INVENTION

The invention relates to novel aqueous binder dispersions, to a process for preparing them, and to their use as coating compositions for high-grade coatings.

BACKGROUND OF THE INVENTION

From the prior art it is known to use dispersions based on copolymers in water-thinnable paints and coating materials. Where the aim is for a high quality level, with respect to, for example, the resistance of the films to solvents or chemicals, the dispersions are equipped with crosslinkable functional groups and prior to application are mixed with a crosslinker, for example with a polyfunctional isocyanate. Aqueous two-component polyurethane coatings, including dispersions based on copolymers containing groups that are crosslinkable with isocyanates, and including polyfunctional isocyanates, are increasingly being used for such profiles of requirements, on the basis of their high quality level.

EP-A 557 844 describes aqueous two-component polyurethane coatings based on hydrophilic polyisocyanates and hydroxy-functional emulsion copolymers which are practically free of carboxylate groups and are stabilized by means of external emulsifiers. Owing to the high molecular weights of the polymers and the enduring hydrophilicity when external emulsifiers are used, such coating systems, for certain applications, have disadvantages in water resistance, pigment wetting, and, in particular, in the optical qualities of the film.

EP-A 358 979, DE-A 42 262 70 and EP-A 1 024 184 describe aqueous two-component polyurethane reactive systems based on vinyl polymer secondary dispersions and polyisocyanate crosslinkers which already have a good level of properties. The vinyl polymers in the systems serve as emulsifiers for the polyisocyanates and so prevent the unwanted reaction between NCO and water. For certain applications, however, improvements in the solids content, in the resistance properties, particularly the water resistance, in film hardness, and in respect to the optical qualities of the film are desirable.

DE-A 44 35 950, DE-A 44 07 415, and DE-A 44 39 669 describe not only solventborne but also aqueous coating materials, in which the drying and also the chemical resistance and/or weather resistance of the coatings can be improved by additionally using cycloaliphatic monomers. For many applications, however, a further improvement in film hardness and—in the case of waterborne coating materials—in particular in the optical qualities of the film (gloss, haze) is desirable.

Disadvantages in the optical qualities of the film, such as low gloss, appreciable haze, levelling problems, for example, are observed in particular when increased use is made of what are referred to as "hardening monomers", i.e. those monomers, which in the form of a homopolymer, have a glass transition temperature ($T_g$) of more than 0° C. Examples of "hardening" monomers are styrene, methyl methacrylate, n-, iso- or tert-butyl methacrylate, and cycloaliphatic (meth)acrylic esters. The cause of these deficiencies in the optical qualities of the film is the difficult or poor incorporability or dispersability of the polyisocyanate crosslinkers in the polyol dispersion, leading to a more heterogeneous distribution of the crosslinker in the binder.

It was an object of the present invention to provide aqueous binders and the coatings resulting therefrom, featuring improved film hardness and optical qualities, which do not have the disadvantages of the prior art.

SUMMARY OF THE INVENTION

The present invention is directed to an aqueous binder dispersion that includes at least one copolymer (P) containing carboxylic acid and/or carboxylate groups, the copolymer (P) including structural units of carboxyl-free (meth) acrylic esters with a cycloaliphatic structure, and at least 25 mol % of the carboxylic acid groups of the copolymer (P) in the dispersion being present in triethanolamine-neutralized form.

The present invention is further directed to a process for preparing the inventive aqueous binder dispersion. The invention is further directed to aqueous coating materials that include the inventive aqueous binder dispersion as well as substrates, where at least a portion of the substrate is coated by the aqueous coating materials.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

As used herein, the terms "(meth)acrylic" and "(meth) acrylate" are meant to include both acrylic and methacrylic acid derivatives and mixtures thereof, such as the corresponding alkyl esters, that may be referred to as acrylates and methacrylates, which the term (meth)acrylate is meant to encompass.

Surprisingly it has been found that aqueous binder dispersions based on acid-functional copolymers (P) containing incorporated structural units of cycloaliphatic monomers and including, at least fractionally, triethanolamine as a neutralizing amine no longer have the disadvantages of the prior art as described above. The coatings resulting therefrom exhibit very good film optical qualities in conjunction with very good hardness and resistance properties, particularly water resistance.

The invention accordingly provides aqueous binder dispersions that include at least one copolymer (P) containing carboxyl and/or carboxylate groups, the copolymer (P) containing structural units of carboxyl-free acrylic and/or methacrylic esters with a cycloaliphatic structure, and at least 25 mol %, and in some cases at least 40 mol %, of the carboxylic acid groups of the copolymer (P) in the dispersion being present in triethanolamine-neutralized form.

The copolymers (P) on which the aqueous binder dispersions of the invention are based are prepared by free-radical polymerization of olefinically unsaturated monomers (M1) to (M5) using free-radical initiators in a one-stage or multistage process. In an embodiment of the invention, the copolymers (P) are prepared from the group of monomers (M) encompassing:

(M1) 10 to 50% by weight, and in some cases 15 to 40% by weight, of cycloaliphatic esters of (meth)acrylic acid or mixtures thereof, (M2) 20 to 60% by weight, and in some cases 25 to 50% by-weight, of hydroxyl-functional free-radically polymerizable monomers, (M3) 1 to 5% by weight, and in some cases 1.5 to 4% by weight, of carboxyl-functional free-radically polymerizable monomers, (M4) 0 to 10% by weight of free-radically polymerizable monomers containing phosphate/phosphonate groups or sulphonic acid/sulphonate groups, and (M5) 10 to 60% by weight, and in some cases 20 to 50% by weight, of hydroxyl- and carboxyl-free (meth)acrylic esters with $C_1$ to $C_{18}$ hydrocarbon radicals in the alcohol moiety and/or vinylaromatics and/or vinyl esters, the sums of the components adding up to 100% by weight.

Examples of suitable monomers (M1) include, but are not limited to cyclohexyl (meth)acrylate, cyclohexyl (meth) acrylates substituted in the ring by alkyl groups, 4-tert-butyl cyclohexyl (meth)acrylate, norbornyl (meth)acrylate, isobornyl (meth)acrylate; isobornyl-acrylate and/or isobornyl methacrylate. In an embodiment of the invention the Monomers (M1) include isobornyl methacrylate. It is also possible to use mixtures that include isobornyl acrylate and/or isobornyl methacrylate and other monomers (M1). The monomers other than isobornyl acrylate and/or isobornyl methacrylate may be used where appropriate in amounts of less than 10% by weight, based on the sum of (M1) to (M5).

Examples of suitable hydroxy-functional monomers (M2) are OH-functional (meth)acrylic esters with $C_1$–$C_{18}$ hydrocarbon radicals in the alcohol moiety, such as hydroxyethyl methacrylate, hydroxypropyl methacrylate, hydroxyethyl acrylate, hydroxypropyl acrylate, hydroxybutyl acrylate or hydroxybutyl methacrylate, for example. Likewise suitable are hydroxy monomers containing alkylene oxide units, such as adducts of ethylene oxide, propylene oxide or butylene oxide with (meth)acrylic acid. In an embodiment of the invention, (M2) is selected from hydroxyethyl methacrylate and hydroxypropyl methacrylate.

By carboxy-functional free-radically polymerizable monomers (M3) are meant olefinically unsaturated monomers with carboxylic acid or carboxylic anhydride groups, such as acrylic acid, methacrylic acid, β-carboxyethyl acrylate, crotonic acid, fumaric acid, maleic acid (anhydride), itaconic acid or monoalkyl esters of dibasic acids or anhydrides, such as monoalkyl maleate. In an embodiment of the invention, (M3) is selected from acrylic acid and methacrylic acid.

Optionally it is possible to use monomers (M4). Suitable examples include unsaturated free-radically polymerizable compounds containing phosphate and/or phosphonate groups or sulphonic acid and/or sulphonate groups, as described for example in WO-A 00/39181 (p. 8 line 13–p. 9 line 19). In an embodiment of the invention, (M4) includes 2-acrylamido-2-methylpropanesulphonic acid.

Suitable monomers (M5) are, for example, hydroxyl- and carboxyl-free (meth)acrylic esters with $C_1$–$C_{18}$ hydrocarbon radicals in the alcohol moiety, examples being ethyl acrylate, n-butyl acrylate, iso-butyl acrylate, 2-ethylhexyl acrylate, methyl methacrylate, ethyl methacrylate, butyl methacrylate or 2-ethylhexyl methacrylate. Likewise suitable are styrene, vinyltoluene, α-methyl styrene, vinyl esters, vinyl monomers containing alkylene oxide units, such as condensation products of (meth)acrylic acid with oligoalkylene oxide monoalkyl ethers, and monomers containing further functional groups, such as epoxy groups, alkoxysilyl groups, urea groups, urethane groups, amide groups or nitrile groups, for example. Additionally, vinyl monomers and/or (meth)acrylate monomers with a functionality of two or more, such as hexanediol di(meth)acrylate, for example, may be used in amounts of 0 to 2% by weight, based on the sum of the monomers (M1) to (M5). In an embodiment of the invention, (M5) is selected from methyl methacrylate, n-butyl acrylate, n-butyl methacrylate and 2-ethylhexyl acrylate.

The present invention likewise provides a process for preparing the aqueous binder dispersions of the invention, characterized in that components (M1), (M2), (M3) and (M5) and, if desired, (M4) are reacted to give a copolymer (P) and the resultant copolymer (P), containing acid groups, is transferred to an aqueous phase, and at least 25 mol % of the carboxyl groups being neutralized with triethanolamine before or during dispersion.

The copolymer (P) may be prepared in principle by conventional free-radical polymerization techniques in an organic phase or in an aqueous phase. In an embodiment of the invention, the copolymer is prepared by polymerization in an organic phase with subsequent dispersing of the resin into the aqueous phase, the acid groups being at least partly neutralized before or during the operation of dispersing the resin. For the preparation of the copolymer (P) it is desirable to employ a multistage polymerization technique, as described for example in EP-A 0 947 557 (p. 3 line 2–p. 4 line 15) or in EP-A 1 024 184 (p. 2 line 53–p. 4 line 9). In this embodiment, a comparatively hydrophobic monomer mixture containing few or no acid groups is prepared, and at a later point in time during the polymerization, a more hydrophilic monomer mixture containing acid groups is metered in.

Instead of a multistage polymerization technique it is likewise possible to conduct the operation continuously (gradient polymerization); in other words, a monomer mixture with a composition which changes is added, the hydrophilic (acid-functional) monomer fractions being higher towards the end of the feed than at the beginning.

The polymerization may be conducted in the presence of a solvent or solvent/water mixture, which is charged to the reaction vessel at the outset. Suitable organic solvents include any of the known solvents typically used in paint technology, non-limiting examples being those commonly used as cosolvents in aqueous dispersions, such as alcohols, ethers, ether-functional alcohols, esters, ketones, N-methylpyrrolidone or apolar hydrocarbons, or mixtures of these solvents. The solvents are used in amounts such that the solvent content of the finished dispersion is 0 to 12% by weight, and in some cases 2 to 10% by weight. If necessary the solvents used may also be removed again in part by means of a distillation, if particularly low organic solvent contents are called for.

Moreover, the polymerization may also be conducted in the presence of a hydrophobic copolymer or else in the presence of a polyester, as described for example in EP-A 543 228, col. 4 lines 9–18 and col. 5 line 38–col. 8 line 13, which may have been diluted with solvent or with solvent/water mixture.

Monomers less reactive in terms of the free-radical polymerization may likewise be included in the initial charge to the reaction vessel, in order to increase the degree to which they are incorporated.

The copolymerization is conducted generally at 40 to 180° C., and in some cases at 80 to 160° C.

Suitable initiators for the polymerization reaction include organic peroxides, non-limiting examples of which include di-tert-butyl peroxide or tert-butyl peroxy-2-ethylhexanoate and azo compounds. The amounts of initiator employed depends on the desired molecular weight. For reasons of operational safety and of greater ease of handling, peroxide initiators may also be employed as a solution in suitable organic solvents, examples of which include those described above.

The number-average molecular weight ($M_n$) of the copolymers (P) can be controlled by carefully choosing the operational parameters, for example, the molar monomer/initiator ratio, the reaction time or the temperature. The Mn for the copolymers (P) is generally between 500 and 30,000, and in some cases between 1000 and 15,000, and in other cases between 1,500 and 10,000. The OH content of the copolymers (P) in 100% form is generally 3.5 to 7.5% by weight, and in some cases 3.8 to 6% by weight, and is determined by the relative amount of the hydroxy-functional monomers used and also, where appropriate, of the hydrophobic copolymer or polyester included in the initial charge.

The amount of acid groups of the copolymer (P) in 100% form, forming the sum of carboxyl/carboxylate, phosphate/phosphonate and sulphonic acid/sulphonate groups, is 5 to 100 meq/100 g, and in some cases 10 to 80 meq/100 g, and is determined by the relative amount of the acid-functional monomers (M3) and (M4) used and also, where appropriate, by small amounts of acid groups in the hydrophobic copolymer or polyester included in the initial charge. The acid number of the copolymer (P) in 100% form can be 15 to 40 mg KOH/g, and in some cases 18 to 30 mg KOH/g. If desired, for the purpose of hydrophilicization, the copolymer (P) may in addition to the acid groups contain, fractionally, monomer units containing alkylene oxide, in incorporated form, or else external emulsifiers. In an embodiment of the invention, however, the copolymer (P) is hydrophilicized only by acid groups, and in some cases only by carboxylic acid groups (or anions thereof).

Use is made in accordance with the invention of an amount of triethanolamine at least corresponding to a degree of neutralization of the carboxyl groups of 25%, and in some cases at least 40%. Optionally, further acid groups of the copolymer (P) can be neutralized with a different base. Suitable for that purpose are organic amines or water-soluble inorganic bases, such as soluble metal hydroxides for example. Non-limiting examples of suitable amines are N-methylmorpholine, triethylamine, diisopropylethylamine, dimethylethanolamine, dimethylisopropanolamine, methyldiethanolamine, diethylethanolamine, triethanolanine, butanolamine, morpholine, 2-aminomethyl-2-methylpropanol or isophoronediamine. In mixtures it is also possible, fractionally, to use ammonia. The neutralizing amines are added in amounts such that in total the degree of neutralization present, i.e. the molar ratio of neutralizing agent to acid, is 40 to 150%, and in some cases 60 to 120%. The pH of the aqueous binder dispersion of the invention is 6.0 to 10.0, and in some cases 6.5 to 9.0.

The aqueous binder dispersions of the invention have a solids content of 25 to 65% by weight, and in some cases 35 to 60% by weight, and an organic solvent content of 0 to 12% by weight, and in some cases 2 to 10% by weight.

Besides the copolymer (P) the binder dispersions of the invention may also where appropriate include other binders or dispersions, based on, as non-limiting examples, polyesters, polyurethanes, polyethers, polyepoxides or polyacrylates, and, if desired, pigments and other auxiliaries and additives known in the paint industry.

The binder dispersions of the invention can be processed to an aqueous coating materials.

The present invention also provides aqueous coating materials including the binder dispersions of the invention and also at least one crosslinker, in some cases a polyisocyanate crosslinker, and in other cases a polyisocyanate crosslinker having free NCO groups.

Through a combination with crosslinkers it is possible in this case, depending on the reactivity or, where appropriate blocking of the crosslinkers, to prepare both one-component coating materials and two-component coating materials. One-component coating materials for the purposes of the present invention are coating compositions wherein binder component and crosslinker component can be stored together without any crosslinking reaction taking place to a marked extent, or to an extent detrimental to the subsequent application. The crosslinking reaction does not take place until during application, after the crosslinker has been activated. This activation can be brought about, for example, by an increase in temperature. Two-component coating materials for the purposes of the present invention are coating compositions wherein, owing to their high reactivity, binder component and crosslinker component have to be stored in separate vessels. The two components are not mixed until shortly before application, when they react generally without additional activation. To accelerate the crosslinking reaction it is, however, also possible to use catalysts or to employ higher temperatures.

Examples of suitable crosslinkers include, but are not limited to polyisocyanate crosslinkers, amide- and amine-formaldehyde resins, phenolic resins, aldehyde resins and ketone resins, such as phenol-formaldehyde resins, for example, resols, furan resins, urea resins, carbamic ester resins, triazine resins, melamine resins, benzoguanamine resins, cyanamide resins, aniline resins, as described in "Lackkunstharze", H. Wagner, H. F. Sarx, Carl Hanser Verlag Munchen, 1971.

In an embodiment of the invention, the crosslinkers used are polyisocyanates having free and/or blocked NCO groups. Examples of suitable blocked polyisocyanates include, but are not limited to those based on isophorone diisocyanate, hexamethylene diisocyanate, 1,4-diisocyanatocyclohexane, bis(4-isocyanatocyclohexane)methane or 1,3-diisocyanatobenzene or based on paint polyisocyanates such as biuret- or isocyanurate group-containing polyisocyanates of 1,6-diisocyanatohexane, isophorone diisocyanate or bis(4-isocyanatocyclohexane)methane or urethane group-containing paint polyisocyanates based on 2,4- and/or 2–6-diisocyanatotoluene or isophorone diisocyanate on the one hand and on low molecular mass polyhydroxyl compounds such as trimethylolpropone, the isomeric propanediols or butanediols or any desired mixtures of such polyhydroxyl compounds on the other.

Examples of suitable blocking agents for the polyisocyanates include, but are not limited to, monohydric alcohols such as methanol, ethanol, butanol, hexanol, cyclohexanol, benzyl alcohol, oximes such as acetoxime, methyl ethyl ketoxime, cyclohexanone oxime, lactams such as ε-caprolactam, phenols, amines such as diisopropylamine or dibutyl amine, dimethylpyrazole or triazole, and also dimethyl malonate, diethyl malonate or dibutyl malonate.

A Particular embodiment of the invention is directed to the use of low-viscosity hydrophobic or hydrophilicized polyisocyanates having free isocyanate groups based on aliphatic, cycloaliphatic, araliphatic and/or aromatic isocyanates. A further embodiment of the invention is directed to aliphatic or cycloaliphatic isocyanates, since in this way it is possible to achieve a particularly high level of resistance in the coating film. These polyisocyanates generally have a viscosity at 23° C. of 10 to 5,000 mPas. If necessary, the polyisocyanates can be used as a blend with small amounts of inert solvents in order to lower the viscosity to a level within the specified range. Triisocyanatononane as well can be used, alone or in mixtures, as a crosslinker component.

The copolymer (P) is generally sufficiently hydrophilic, so that hydrophobic crosslinker resins as well can be dispersed.

Water-soluble or dispersible polyisocyanates are obtainable, for example, by modification with carboxylate, sulphonate and/or polyethylene oxide groups and/or polyethylene oxide/polypropylene oxide groups. The polyisocyanates can be made hydrophilic by reacting them, for example, with substoichiometric amounts of monohydric, hydrophilic polyether alcohols. The preparation of such hydrophilicized polyisocyanates is described, for example, in EP-A 0 540 985 (p. 3 line 55 to p. 4 line 5). Also highly suitable are the polyisocyanates containing allophanate groups that are described in EP-A 959 087 (p. 3 lines 39 to 51) and are prepared by reacting low-monomer-content polyisocyanates with polyethylene oxide polyether alcohols under allophanatization conditions. Also suitable are the water-dispersible, triisocyanatononane-based polyisocyanate mixtures described in DE-A 100 078 21 (p. 2 line 66 to p. 3 line 5), and also polyisocyanates hydrophilicized with ionic groups (sulphonate, phosphonate groups), as described, for example, in DE 100 24 624 (p. 3 lines 13 to 33). Hydrophilicization is likewise possible by addition of commercially customary emulsifiers.

Also possible in principle of course is the use of mixtures of different crosslinker resins.

Before, during or after the preparation of the aqueous binder dispersion of the invention it is possible to add the customary auxiliaries and additives of paint technology, such as defoamers, thickeners, pigments, dispersing assistants, catalysts, anti-skinning agents, anti-settling agents or emulsifiers, for example.

These auxiliaries and additives may also be added to the coating material including the aqueous binder dispersions of the invention.

The aqueous coating materials including the binder dispersions of the invention are suitable for all fields of use in which aqueous paint and coating systems with stringent requirements on the stability of the films find use: for example, for the coating of mineral building material surfaces, varnishing and sealing of wood and wood materials, coating of metallic surfaces (metal coating), coating and painting of asphaltic or bituminous coverings, painting and sealing of various plastics surfaces (plastics coating) and high-gloss paints.

The invention also provides for the use of the aqueous coating materials of the invention for coating substrates, useful for coating metallic surfaces and plastics, and also provides substrates thus coated. As such, the aqueous coating materials of the invention are used to coat a substrate by applying the aqueous coating materials over at least a portion of a substrate.

The aqueous coating materials including the binder dispersions of the invention are used for preparing primers, surfacers, pigmented or transparent topcoat materials, clearcoat materials and high-gloss coating materials, and also single-coat coating materials, which can be employed in individual and serial application, in the field of industrial coating, for example, automotive OEM finishing and automotive refinish.

In an embodiment of the invention, the aqueous coating materials including the binder dispersions of the invention are used for coating or painting metallic surfaces or plastics at from room temperature to 140° C. In this embodiment, the crosslinkers can be aliphatic polyisocyanates. The coatings of this embodiment of the invention combine very good film optical qualities with a high level of solvent and chemical resistance, good weather stability, high hardness and rapid drying.

The coatings can be produced by any of a variety of spraying techniques such as, for example, air-pressure, airless or electrostatic spraying techniques using one-component or, where appropriate, two-component spraying units. However, it is also possible to use other methods, such as brushing, rolling or knife coating, for example, to apply the paints and coating materials including the binder dispersions of the invention.

The present invention further provides substrates coated with coating materials that include at least one binder dispersion of the invention.

The invention is further illustrated but is not intended to be limited by the following examples in which all parts and percentages are by weight unless otherwise specified.

EXAMPLES

All figures in % are percent by weight unless stated otherwise. Viscosity measurements were made in a cone-and-plate viscosimeter in accordance with DIN 53019 at a shear rate of 40 s$^{-1}$.

Example 1 (Inventive)

A 15 l reaction vessel with stirring, cooling and heating means is charged with 2100 g of a hydrophobic polyacrylate resin (Desmophen® A 160, Bayer AG, Leverkusen, Germany) as a 60% strength solution in Solvent Naphtha® 100 (Exxon-Chemie, Esso Deutschland GmbH, DE), having an OH content (in 100% form) of 2.6%, an acid number (in 100% form) of 5 mg KOH/g and an average molecular weight $M_n$ of 4800, together with 735 g of propylene glycol n-butyl ether, and this initial charge is heated to 138° C. At this temperature a solution of 33 g of di-tert-butyl peroxide in 33 g of propylene glycol n-butyl ether is added over 20 minutes. Thereafter a monomer mixture of 594 g of methyl methacrylate, 724 g of butyl methacrylate, 171 g of butyl acrylate, 892 g of isobornyl methacrylate and 1035 g of hydroxyethyl methacrylate and, in parallel, a solution of 53 g of di-tert-butyl peroxide in 53 g of propylene glycol n-butyl ether are metered in over the course of 3 hours at a uniform rate at this temperature. This temperature is held for 10 minutes and then a solution of 80 g of di-tert-butyl peroxide in 80 g of propylene glycol n-butyl ether is metered in over the course of 1 hour 50 minutes and, 20 minutes after the start of this peroxide metering, a monomer mixture of 594 g methyl methacrylate, 724 g of butyl methacrylate, 171 g of butyl acrylate, 892 g of isobornyl methacrylate and 1035 g of hydroxyethyl methacrylate is metered in at a uniform rate in parallel over the course of 1 hour 30 minutes at this temperature, so that peroxide metering and monomer metering are ended at the same time. The mixture is held at 138° C. for 30 minutes and then a mixture of 520 g of methyl methacrylate, 408 g of butyl acrylate, 734 g of hydroxyethyl methacrylate and 245 g of acrylic acid and, in parallel, a solution of 33 g of di-tert-butyl peroxide in 60 g of Solvent Naphtha® 100 are metered in over 90 minutes. After one further hour of stirring at 138° C. the polymer solution is cooled.

Then, in a dispersing vessel, 1551 g of the above polymer solution are heated at 90° C. to 100° C., 68.8 g of triethanolamine are added and the mixture is homogenized and dispersed with 1350 g of water. This gives a copolymer (P), present in dispersion in water, with the following data:

| | |
|---|---|
| OH content (in 100% form) = | 3.9%, |
| Acid number (in 100% form) = | 22 mg KOH/g, |
| Solids content = | 46.5%, |
| Viscosity = | about 1700 mPas (23° C., shear rate $40^{-1}$), |
| PH (10% strength in water) = | 7.5, |
| Degree of neutralization = | 105%. |

The dispersion has an average particle size of about 150 nm.

Example 2 (Not Inventive)

The procedure of Example 1 is repeated with the difference that in this case 2893 g of the polymer solution are neutralized at 90° C. to 100° C. with 76.6 g of dimethylethanolamie and homogenized. The amount of water needed for dispersing and viscosity setting is in this case about 2740 g. This gives a copolymer (P), present in dispersion in water, with the following data:

| | |
|---|---|
| OH content (in 100% form) = | 3.9%, |
| Acid number (in 100% form) = | 22 mg KOH/g, |
| Solids content = | 43.2%, |
| Viscosity = | about 1450 mPas (23° C., shear rate $40^{-1}$), |
| PH (10% strength in water) = | 8.1, |
| Degree of neutralization = | 105%. |

The dispersion has an average particle size of about 130 nm.

Application Examples

| Products used: | |
|---|---|
| Surfynol ® 104 E: | Defoaming wetting agent, Air Products, represented by W. Biesterfeld & Co., Hamburg, DE |
| Tronox ® R-KB-4: | Titanium dioxide pigment, Kerr McGee Pigments GmbH & Co. KG, DE |
| Acrysol ® RM 8: | 20% strength in ethanol, thickener, Rohm & Haas Deutschland GmbH, Frankfurt am Main, DE |
| Byk ® 346 | Levelling additive/substrate wetting, Byk Chemie, Wesel, DE |
| Byk ® 380 | Levelling additive/anti-crater agent, Byk Chemie, Wesel, DE |
| Bayhydur ® VP LS 2319 | Hydrophilicized, aliphatic polyisocyanate, 80% strength in methoxypropyl acetate, Bayer AG Leverkusen, DE |
| Surfynol ® 104 BC | Defoaming wetting agent, Air Products, represented by W. Biesterfeld & Co., Hamburg, DE |
| Bayhydur ® 3100 | Hydrophilicized, aliphatic polyisocyanate, Bayer AG Leverkusen |
| Desmodur ® N 3600 | Aliphatic polyisocyanate, Bayer AG, Leverkusen. |

Example 3

Preparation of Pigmented Topcoat Materials (Table 1)

220 g of binder dispersion from Example 1, 5.4 g of Surfynol® 104, 36 g of distilled water, 200.1 g of titanium dioxide (Tronox® R-KB-4) are dispersed in a shaker. 150 g of the resulting millbase are mixed in a dissolver with 32.6 g of dispersion from Ex. 1, 0.45 g of Byk® 346, 0.68 g of Byk® 380, 1.2 g of Acrysol® RM8, 18.1 g of Desmodur® N 3600 and 24.7 g of Bayhydurg® 3100 and adjusted with about 53 g of distilled water to a viscosity of about 30 seconds at 23° C. in the DIN 4 flow cup. The pH is 7.6; the NCO—OH ratio is 1.5:1.

In the same way, 220 g of binder dispersion from Example 2, 5.1 g of Surfynol® 104, 32.4 g of distilled water, 191.3 g of titanium dioxide (Tronox® R-KB-4) are dispersed in a shaker. 150 g of the resulting millbase are mixed in a dissolver with 33.5 g of dispersion from Ex. 1, 0.45 g of Byk® 346, 0.68 g of Byk® 380, 1.2 g of Acrysol® RM8, 17.9 g of Desmodur® N 3600 and 24.3 g of Bayhydur® 3100 and adjusted with about 49 g of distilled water to a viscosity of about 30 seconds at 23° C. in the DIN 4 flow cup. The pH is 8.3; the NCO—OH ratio is 1.5:1.

After the two coating materials have been applied to degreased steel panels, the coating films are dried at room temperature. For characteristics and test results of the coating see Table 1.

TABLE 1

Characteristics and properties of the aqueous 2K-PUR white paints of Example 3

| | Binder Ex. | |
|---|---|---|
| | 1 | 2 (compar.) |
| Isobornyl methacrylate content of copolymer (P) | 17.5% | 17.5% |
| Neutralizing amine | TEAOH* | DMEA* |
| Degree of neutralization | 105% | 105% |
| OH content | 3.9% | 3.9% |
| Acid number | 22 | 22 |
| Performance Testing | | |
| Gloss (20° angle) | 71 | 66 |
| Drying dust-dry/tack-free [h] | 1/5 | 1/5 |
| Pendulum hardness [s] | 157 | 144 |
| Water resistance** | >14 | 7 |
| Solvent resistance acetone/xylene*** | 1/0 | 1/0 |

*TEAOH = triethanolamine; DMEA = dimethylethanolamine
**First finding (blistering, loss of gloss after x days)
***Exposure 5 min; 0 = no damage; 5 = paint detached It is evident from the figures in Table 1 that the paint based on the inventive dispersion from Example 1 is markedly superior to the non-inventive, comparative paint in terms of water resistance and film optical qualities, in conjunction with very good hardness and solvent resistance.

Example 4 (Inventive)

A 6 l reaction vessel with stirring, cooling and heating means is charged with 250 g (1.1 mol) of Cardura® E 10 (Versatic acid glycidyl ester, Resolution Deutschland GmbH, Eschbom), together with 180 g of propylene glycol n-butyl ether, and 200 g of Solvent Naphtha® (Exxon Chemie, Esso Deutschland GmbH, DE) 100, and this initial charge is heated to 138° C. At this temperature a solution of 8 g of di-tert-butyl peroxide in 8 g of propylene glycol n-butyl ether is added over the course of 20 minutes. Thereafter a monomer mixture of 145.5 g of methyl methacrylate, 204.8 g of butyl methacrylate, 42 g of butyl acrylate, 218.7 g of isobornyl methacrylate, 220 g of hydroxyethyl methacrylate and 72 g (1.0 mol) of acrylic acid and, in parallel, a solution of 13 g of di-tert-butyl peroxide in 13 g of propylene glycol n-butyl ether are metered in over the course of 3 hours at a uniform rate at this temperature. This temperature is held for about 3 hours, until an acid number of less than 3 has been reached. The acrylic acid used here does not contribute to hydrophilicization but instead is reacted completely with Cardura® ET 10 to give the hydroxy ester. Then a solution of 19.5 g of di-tert-butyl peroxide in 19.5 g of propylene glycol n-butyl ether is metered in over the course of 1 hour 50 minutes and, 20 minutes after the start of this peroxide metering, a monomer mixture of 145.5 g of methyl methacrylate, 204.7 g of butyl methacrylate, 42 g of butyl acrylate, 218.8 g of isobornyl methacrylate and 220 g of hydroxyethyl methacrylate is metered in at a uniform rate in parallel over the course of 1 hour 30 minutes at this temperature, so that peroxide metering and monomer metering are ended at the same time. The mixture is held at 138° C. for 30 minutes and then a mixture of 127.5 g of methyl methacrylate, 100 g of butyl acrylate, 180 g of hydroxyethyl methacrylate and 53.7 g of acrylic acid and, in parallel, a solution of 8 g of di-tert-butyl peroxide in 20.6 g of Solvent Naphtha® 100 are metered in over 90 minutes. After one further hour of stirring at 138° C. the polymer solution is cooled to 90 to 100° C., 130.4 g of triethanolamine are added and the mixture is homogenized and dispersed with 2700 g of water. This gives a copolymer (P), present in dispersion in water, with the following data:

| | |
|---|---|
| OH content (in 100% form) = | 3.9%, |
| Acid number (in 100% form) = | 21 mg KOH/g, |
| Solids content = | 46.0%, |
| Viscosity = | about 1500 mPas (23° C., shear rate $40^{-1}$), |
| PH (10% strength in water) = | 7.3, |
| Degree of neutralization = | 105%. |

The dispersion has an average particle size of about 130 nm.

Example 5 (Inventive)

A 15 l reaction vessel with stirring, cooling and heating means is charged with 2100 g of a hydrophobic polyacrylate resin (Desmophen® A 160, Bayer AG, Leverkusen, DE) as a 60% strength solution in Solvent Naphtha® 100 (Exxon Chemie, Esso Deutschland GmbH, DE), having an OH content (in 100% form) of 2.6%, an acid number (in 100% form) of 5 mg KOH/g and an average molecular weight $M_n$ of 4800, together with 735 g of propylene glycol n-butyl ether, and this initial charge is heated to 142° C. At this temperature a solution of 33 g of di-tert-butyl peroxide in 33 g of propylene glycol n-butyl ether is added over 20 minutes. Thereafter a monomer mixture of 594 g of methyl methacrylate, 724 g of butyl methacrylate, 171 g of butyl acrylate, 892 g of isobornyl methacrylate and 1035 g of hydroxyethyl methacrylate and, in parallel, a solution of 53 g of di-tert-butyl peroxide in 53 g of propylene glycol n-butyl ether are metered in over the course of 3 hours at a uniform rate at this temperature. This temperature is held for 10 minutes and then a solution of 80 g of di-tert-butyl peroxide in 80 g of propylene glycol n-butyl ether is metered in over the course of 1 hour 50 minutes and, 20 minutes after the start of this peroxide metering, a monomer mixture of 594 g of methyl methacrylate, 724 g of butyl methacrylate, 172 g of butyl acrylate, 892 g of isobornyl methacrylate and 1035 g of hydroxyethyl methacrylate is metered in at a uniform rate in parallel over the course of 1 hour 30 minutes at this temperature, so that peroxide metering and monomer metering are ended at the same time. The mixture is held at 142° C. for 30 minutes and then a mixture of 459 g of methyl methacrylate, 408 g of butyl acrylate, 734 g of hydroxyethyl methacrylate and 306 g of acrylic acid and, in parallel, a solution of 33 g of di-tert-butyl peroxide in 60 g of Solvent Naphtha® 100 are metered in over 90 minutes. After one further hour of stirring at 142° C. the polymer solution is cooled.

Then, in a dispersing vessel, 3037 g of the above polymer solution are heated at 90° C. to 100° C., a mixture (1:1 molar) of 84.1 g of triethanolamine and 50.3 g of dimethylethanolamine is added and the mixture is homogenized and dispersed with 2675 g of water. This gives a copolymer (P), present in dispersion in water, with the following data:

| | |
|---|---|
| OH content (in 100% form) = | 3.9%, |
| Acid number (in 100% form) = | 24 mg KOH/g, |
| Solids content = | 44.7%, |
| Viscosity = | about 2300 mPas (23° C., shear rate $40^{-1}$), |
| PH (10% strength in water) = | 7.7, |
| Degree of neutralization = | 105%. |

The dispersion has an average particle size of about 130 nm.

Example 6 (Inventive)

A 15 l reaction vessel with stirring, cooling and heating means is charged with 1550 g of propylene glycol n-butyl ether, and this initial charge is heated to 142° C. At this temperature a solution of 33 g of di-tert-butyl peroxide in 33 g of propylene glycol n-butyl ether is added over 20 minutes. Thereafter a monomer mixture of 608 g of methyl methacrylate, 724 g of butyl methacrylate, 361 g of butyl acrylate, 892 g of isobornyl methacrylate, 287 g of styrene and 1158 g of hydroxyethyl methacrylate and, in parallel, a solution of 63 g of di-tert-butyl peroxide in 63 g of propylene glycol n-butyl ether are metered in over the course of 3 hours at a uniform rate at this temperature. This temperature is held for 10 minutes and then a solution of 94 g of di-tert-butyl peroxide in 94 g of propylene glycol n-butyl ether is metered in over the course of 1 hour 50 minutes and, 20 minutes after the start of this peroxide metering, a monomer mixture of 608 g of methyl methacrylate, 724 g of butyl methacrylate, 361 g of butyl acrylate, 892 g of isobornyl methacrylate, 287 g of styrene and 1158 g of hydroxyethyl methacrylate is metered in at a uniform rate in parallel over the course of 1 hour 30 minutes at this temperature, so that peroxide metering and monomer metering are ended at the same time. The mixture is held at 142° C. for 30 minutes and then a mixture of 459 g of methyl methacrylate, 408 g of butyl acrylate, 734 g of hydroxyethyl methacrylate and 316 g of acrylic acid and, in parallel, a solution of 33 g of di-tert-butyl peroxide in 60 g of Solvent Naphtha® 100 (Exxon Chemie, Esso Deutschland GmbH, DE) are metered in over 90 minutes. After one further hour of stirring at 142° C. the polymer solution is cooled.

Then, in a dispersing vessel, 3071 g of the above polymer solution are heated at 90° C. to 100° C., a mixture (1:1 molar) of 87.9 g of triethanolamine and 52.5 g of dimethylethanolamine is added and the mixture is homogenized and dispersed with 2750 g of water. This gives a copolymer (P), present in dispersion in water, with the following data:

| | |
|---|---|
| PH content (in 100% form) = | 3.9%, |
| Acid number (in 100% form) = | 23 mg KOH/g, |
| Solids content = | 45.4%, |
| Viscosity = | about 1700 mPas (23° C., shear rate $40^{-1}$), |
| PH (10% strength in water) = | 7.7, |
| Degree of neutralization = | 105%. |

The dispersion has an average particle size of about 125 nm.

Example 7 (Not Inventive)

A 6 l reaction vessel with stirring, cooling and heating means is charged with 515 g of a hydrophobic polyacrylate resin (Desmophen® A 160, Bayer AG, Leverkusen, DE) as a 60% strength solution in Solvent Naphtha® 100 (Exxon Chemie, Esso Deutschland GmbH, DE), having an OH content (in 100% form) of 2.6%, and an acid number (in 100% form) of 5 mg KOH/g, together with 172 g of butylglycol, and this initial charge is heated to 138° C. At this temperature a solution of 8 g of di-tert-butyl peroxide in 8 g of butylglycol is added over 20 minutes. Thereafter a mixture of 784 g of methyl methacrylate, 503 g of butyl acrylate and 390 g of hydroxyethyl methacrylate and, in parallel, a solution of 32.5 g of di-tert-butyl peroxide in 35 g of butylglycol are metered in over the course of 4 h at this temperature. The mixture is held at 138° C. for 30 minutes and then a mixture of 128 g of methyl methacrylate, 100 g of butyl acrylate, 180 g of hydroxyethyl methacrylate and 58 g of acrylic acid and, in parallel, a solution of 8 g of di-tert-butyl peroxide in 20 g of butylglycol are metered in over the course of 90 minutes. After one further hour of stirring at 138° C. the polymer solution is cooled to 90° C., 78 g of dimethylethanolamine are added, and the mixture is homogenized and dispersed in 2300 g of water. This gives a copolymer (P), present in dispersion in water, with the following data:

| | |
|---|---|
| OH content (in 100% form) = | 3.3%, |
| Acid number (in 100% form) = | 20 mg KOH/g, |
| Solids content = | 47%, |
| Viscosity = | about 1500 mPas (23° C., shear rate $40^{-1}$), |
| PH (10% strength in water) = | 8.5, |
| Degree of neutralization = | 105%. |

The dispersion has an average particle size of about 120 nm.

Application Examples

Example 8

Preparation of Pigmented Topcoat Materials (Table 2)

In accordance with the procedure in Example 3, pigmented topcoat materials are formulated with the binder dispersions of Examples 5, 6 and 7 and are applied. Table 2 shows the initial masses and the test results obtained:

TABLE 2

Characteristics, formulation and properties of the aqueous 2K-PUR white paints in accordance with Example 8

| | Binder Ex. | | |
|---|---|---|---|
| | 5 | 6 | 7 (comparative) |
| Isobornyl methacrylate content of copolymer (P) | 17.5% | 17.5% | — |
| Neutralizing amine | TEAOH/DMEA 1:1* | TEAOH/DMEA 1:1* | DMEA* |
| Degree of neutralization | 105% | 105% | 105% |
| OH content of copolymer (P) | 3.9% | 3.9% | 3.3% |
| Acid number of copolymer (P) | 24 | 23 | 20 |
| Paint formulation (initial masses in g) Preparation of the millbase: | | | |
| Binder dispersion | 220 | 220 | 220 |
| Surfynol ® 104 | 6 | 5 | 5 |
| Tronox ® R-KB-4 | 208 | 202 | 186 |
| Demin. water | 27 | 29 | 30 |
| Make-up and crosslinking | | | |
| Millbase | 150 | 150 | 150 |
| Binder dispersion | 30 | 29 | 30 |
| Acrysol ® RM8 (20% strength in ethanol) | 1.22 | 1.21 | 1.16 |
| Byk ® 346 | 0.47 | 0.47 | 0.44 |
| Byk ® 380 | 0.70 | 0.70 | 0.67 |
| Bayhydur ® VP LS 2319 | 47 | 46 | 40 |
| Demin. water | 59 | 48 | 45 |
| Technical coating properties | | | |
| Gloss (20° angle) | 78 | 78 | 78 |
| Drying dust-dry/tack-free [h] | 0.5/6 | 1/6 | 1.6 |
| Pendulum hardness [s] | 139 | 122 | 87 |
| Water resistance** | >14 | >14 | 4 |
| Solvent resistance acetone/xylene*** | 1/0 | 2/0 | 4/1 |

*TEAOH = triethanolamine; DMEA = dimethylethanolamine
**First finding (blistering, loss of gloss after x days)
***Exposure 5 min; 0 = no damage; 5 = paint detached It is evident from the figures in Table 2 that the paints based on the dispersions of the invention from Examples 5 and 6 are markedly superior to the non-inventive, comparative paint from Example 7 in terms of hardness, solvent resistance, and, in particular, water resistance, in conjunction with very good film optical qualities and drying.

Example 9 (Inventive)

A 15 l reaction vessel with stirring, cooling and heating means is charged with 600 g of dipropylene glycol dimethyl ether and 878 g of propylene glycol n-butyl ether, and this initial charge is heated to 138° C. At this temperature a solution of 45 g of di-tert-butyl peroxide in 45 g of propylene glycol n-butyl ether is added over 20 minutes. Thereafter a monomer mixture of 348 g of methyl methacrylate, 724 g of butyl methacrylate, 361 g of butyl acrylate, 913 g of isobornyl methacrylate, 255 g of styrene and 1392 g of hydroxyethyl methacrylate and, in parallel, a solution of 87 g of di-tert-butyl peroxide in 87 g of propylene glycol n-butyl ether are metered in over the course of 3 hours at a uniform rate at this temperature. This temperature is held for 10 minutes and then a solution of 130 g of di-tert-butyl peroxide in 130 g of propylene glycol n-butyl ether is metered in over the course of 1 hour 50 minutes and, 20 minutes after the start of this peroxide metering, a monomer mixture of 348 g of methyl methacrylate, 724 g of butyl methacrylate, 361 g of butyl acrylate, 913 g of isobornyl methacrylate, 255 g of styrene and 1392 g of hydroxyethyl methacrylate is metered in at a uniform rate in parallel over the course of 1 hour 30 minutes at this temperature, so that peroxide metering and monomer metering are ended at the same time. The mixture is held at 138° C. for 30 minutes and then a mixture of 439 g of methyl methacrylate, 408 g of butyl acrylate, 734 g of hydroxyethyl methacrylate and 326 g of acrylic acid and, in parallel, a solution of 45 g of di-tert-butyl peroxide in 60 g of propylene glycol n-butyl ether are metered in over 90 minutes. After one further hour of stirring at 138° C. the polymer solution is cooled.

Then, in a dispersing vessel, 2600 g of the above polymer solution are heated at 90° C. to 100° C., 153.6 g of triethanolamine are added and the mixture is homogenized and dispersed with 2500 g of water. This gives a copolymer (P), present in dispersion in water, with the following data:

| | |
|---|---|
| OH content (in 100% form) = | 4.5%, |
| Acid number (in 100% form) = | 23 mg KOH/g, |
| Solids content = | 44.2%, |
| Viscosity = | about 2500 mPas (23° C., shear rate 40$^{-1}$), |
| PH (10% strength in water) = | 7.4, |
| Degree of neutralization = | 105%. |

The dispersion has an average particle size of about 125 nm.

A black paint obtainable by dispersing this binder dispersion with a black pigment slurry and Bayhydur® VP LS 2319 in the crosslinking ratio NCO:OH=1.5:1 exhibits excellent film optical qualities (gloss=87 at a 20° angle); haze<20), a pendulum hardness of 199 s and very good resistances to water, solvents and chemicals.

Example 10 (Not Inventive)

A 6 l reaction vessel with stirring, cooling and heating means is charged with 515 g of a hydrophobic polyacrylate resin (Desmophen® A 160, Bayer AG, Leverkusen, DE) as a 60% strength solution in Solvent Naphtha® 100 (Exxon Chemie, Esso Deutschland GmbH, DE), having an OH content (in 100% form) of 2.6%, and an acid number (in 100% form) of 5 mg KOH/g, together with 172 g of butylglycol, and this initial charge is heated to 138° C. At this temperature a solution of 8 g of di-tert-butyl peroxide in 8 g of butylglycol is added over 20 minutes. Thereafter a mixture of 392 g of methyl methacrylate, 251.7 g of butyl acrylate, and 195 g of hydroxyethyl methacrylate and, in parallel, a solution of 13 g of di-tert-butyl peroxide in 15 g of butylglycol are metered in over the course of 3 hours at this temperature. This temperature is held for 10 minutes and then a solution of 19.5 g of di-tert-butyl peroxide in 19.5 g of butylglycol is metered in over the course of 1 hour 50 minutes and, 20 minutes after the start of this peroxide metering, a monomer mixture of 392 g of methyl methacrylate, 251.8 g of butyl acrylate and 195 g of hydroxyethyl methacrylate is metered in at a uniform rate in parallel over the course of 1 hour 30 minutes at this temperature, so that peroxide metering and monomer metering are ended at the same time. The mixture is held at 138° C. for 30 minutes and then a mixture of 128 g of methyl methacrylate, 100 g of butyl acrylate, 180 g of hydroxyethyl methacrylate and 58 g of acrylic acid, and in parallel, a solution of 8 g of di-tert-butyl peroxide in 20 g of butylglycol are metered in over 90 minutes. After one further hour of stirring at 138° C. the solution is cooled to 90° C., 130.5 g of dimethylethanolamine are added, and the mixture is homogenized and dispersed in 2380 g of water. This gives a copolymer (P), present in dispersion in water, with the following data:

| | |
|---|---|
| OH content (in 100% form) = | 3.3%, |
| Acid number (in 100% form) = | 20 mg KOH/g, |
| Solids content = | 49.5%, |
| Viscosity = | about 1700 mPas (23° C., shear rate 40$^{-1}$), |
| PH (10% strength in water) = | 7.5, |
| Degree of neutralization = | 105%. |

The dispersion has an average particle size of about 155 nm.

A pigmented topcoat material formulated with this binder dispersion according to Example 3 does exhibit very good film optical qualities but has distinct weaknesses in its tack-free drying and dust-dry drying.

Example 11 (Not Inventive)

A 6 l reaction vessel with stirring, cooling and heating means is charged with 515 g of a hydrophobic polyacrylate resin (Desmophen® A 160, Bayer AG, Leverkusen, DE) as a 60% strength solution in Solvent Naphtha® 100 (Exxon Chemie, Esso Deutschland GmbH, DE), having an OH content (in 100% form) of 2.6%, an acid number (in 100% form) of 5 mg KOH/g and an average molecular weight $M_n$ of 4800, together with 180 g of propylene glycol n-butyl ether, and this initial charge is heated to 138° C. At this temperature a solution of 8 g of di-tert-butyl peroxide in 8 g of propylene glycol n-butyl ether is added over 20 minutes. Thereafter a monomer mixture of 67.5 g of methyl methacrylate, 262.7 g of butyl methacrylate, 312.5 g of isobornyl methacrylate and 195 g of hydroxyethyl methacrylate and, in parallel, a solution of 13 g of di-tert-butyl peroxide in 13 g of propylene glycol n-butyl ether are metered in over the course of 3 hours at a uniform rate at this temperature. This temperature is held for 10 minutes and then a solution of 19.5 g of di-tert-butyl peroxide in 19.5 g of propylene glycol n-butyl ether is metered in over the course of 1 hour 50 minutes and, 20 minutes after the start of this peroxide metering, a monomer mixture of 67.5 g of methyl methacrylate, 262.8 g of butyl methacrylate, 312.5 g of isobornyl methacrylate and 195 g of hydroxyethyl methacrylate is metered in at a uniform rate in parallel over the course of 1 hour 30 minutes at this temperature, so that peroxide metering and monomer metering are ended at the same time. The mixture is held at 138° C. for 30 minutes and then a mixture of 127.5 g of methyl methacrylate, 100 g of butyl acrylate, 180 g of hydroxyethyl methacrylate and 60 g of acrylic acid and, in parallel, a solution of 8 g of di-tert-butyl peroxide in 15 g of Solvent Naphtha® 100 are metered in over 90 minutes. After one further hour of stirring at 138° C. the polymer solution is cooled to 90° C. to 100° C., 77.9 g of dimethylethanolamine are added, and the mixture is homogenized and dispersed with 2900 g of water. This gives a copolymer (P), present in dispersion in water, with the following data:

| | |
|---|---|
| OH content (in 100% form) = | 3.3%, |
| Acid number (in 100% form) = | 21 mg KOH/g, |
| Solids content = | 42.6%, |
| Viscosity = | about 1400 mPas (23° C., shear rate $40^{-1}$), |
| PH (10% strength in water) = | 8.3, |
| Degree of neutralization = | 105%. |

The dispersion has an average particle size of about 160 nm.

A pigmented topcoat material formulated with this binder dispersion according to Example 3 does exhibit rapid dust-dry and tack-free drying and high hardness, but also exhibits poor water resistance (only 1 d without any finding) and, with a gloss of 42 at a 20° angle, unacceptable film optical qualities.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous binder dispersion comprising at least one copolymer (P) containing carboxylic acid and/or carboxylate groups, the copolymer (P) containing structural units of carboxyl-free (meth)acrylic esters with a cycloaliphatic structure, and at least 25 mol % of the carboxylic acid and/or carboxylate groups of the copolymer (P) in the dispersion being present in triethanolamine-neutralized form, wherein the copolymer (P) is prepared from the group of the monomers (M) comprising
   (M1) 10 to 50% by weight of cycloaliphatic esters of (meth)acrylic acid or mixtures thereof,
   (M2) 20 to 60% by weight of hydroxyl-functional free-radically polymerizable monomers,
   (M3) 1 to 5% by weight of carboxyl-functional free-radically polymerizable monomers,
   (M4) 0 to 10% by weight of free-radically polymerizable monomers containing phosphate/phosphonate groups or sulphonic acid/sulphonate groups, and
   (M5) 10 to 60% by weight of hydroxyl- and carboxyl-free (meth)acrylic esters with $C_1$ to $C_{18}$ hydrocarbon radicals in the alcohol moiety and/or vinylaromatics and/or vinyl esters,
the sums of the components adding up to 100% by weight.

2. The aqueous binder dispersion according to claim 1, characterized in that at least 40 mol % of the carboxylic acid groups of the copolymer (P) in the dispersion are present in triethanolamine-neutralized form.

3. The aqueous binder dispersion according to claim 1, wherein the monomers (M1) comprise one or both of isobornyl acrylate and isobornyl methacrylate.

4. The aqueous binder dispersion according to claim 2 wherein the monomers (M1) comprise one or both of isobornyl acrylate and isobornyl methacrylate.

5. The aqueous binder dispersion according to one or more of claim 1, wherein the OH content of the copolymers (P) in 100% form is 3.5 to 7.5% by weight.

6. The aqueous binder dispersion according to claim 1, wherein the acid number of the copolymers (P) in 100% form is 15 to 40mg KOH/g.

7. A process for preparing the aqueous binder dispersion of claim 1 comprising reacting components (M1), (M2), (M3) and (M5) and optionally (M4) to provide a copolymer (P); and transferring the resultant copolymer (P) to an aqueous phase by dispersion, wherein the copolymer (P) contains carboxylic acid groups and at least 25 mol% of the carboxylic acid groups are neutralized with triethanolamine before or during dispersion.

8. An aqueous coating material comprising the binder dispersion of claim 1 and also at least one crosslinker.

9. The aqueous coating materials according to claim 8, wherein the crosslinker is a polyisocyanate crosslinker having free NCO groups.

10. A method of coating a substrate comprising applying the aqueous coating material of claim 8 over at least a portion of a substrate.

11. The aqueous coating material of claim 8 in the form of a coating material selected from one or more of the group consisting of primers, surfacers, pigmented topcoat materials, transparent topcoat materials, clearcoat materials, high-gloss coating materials, and single-coat coating materials.

12. A substrate, wherein at least a portion thereof is coated with a coating materials comprises the binder dispersion of claim 1.

* * * * *